United States Patent
Kaga et al.

(10) Patent No.: US 12,355,890 B2
(45) Date of Patent: Jul. 8, 2025

(54) AUTHENTICATION APPARATUS AND AUTHENTICATION METHOD

(71) Applicant: Hitachi, Ltd., Tokyo (JP)

(72) Inventors: Yosuke Kaga, Tokyo (JP); Kenta Takahashi, Tokyo (JP); Masakazu Fujio, Tokyo (JP); Wataru Nakamura, Tokyo (JP); Yoshiko Yasumura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 224 days.

(21) Appl. No.: 18/044,423

(22) PCT Filed: Aug. 23, 2021

(86) PCT No.: PCT/JP2021/030731
§ 371 (c)(1),
(2) Date: Mar. 8, 2023

(87) PCT Pub. No.: WO2022/172491
PCT Pub. Date: Aug. 18, 2022

(65) Prior Publication Data
US 2023/0327876 A1     Oct. 12, 2023

(30) Foreign Application Priority Data
Feb. 12, 2021    (JP) .................... 2021-020701

(51) Int. Cl.
*H04L 9/32* (2006.01)
*H04L 9/08* (2006.01)
(52) U.S. Cl.
CPC .......... *H04L 9/3231* (2013.01); *H04L 9/0866* (2013.01)

(58) Field of Classification Search
CPC .. H04L 9/3231; H04L 63/0861; H04L 9/0866
(Continued)

(56) References Cited

U.S. PATENT DOCUMENTS

| 11,405,387 B1 * | 8/2022 | Griffin | ................ H04L 9/0866 |
| 2018/0241558 A1 | 8/2018 | Takahashi | |

(Continued)

FOREIGN PATENT DOCUMENTS

| EP | 3731116 A1 * | 10/2020 | ......... G06K 9/00456 |
| JP | 2020005064 A * | 1/2020 | ............... H04L 9/32 |
| JP | 2020067719 A * | 4/2020 | ............... H04L 9/32 |

OTHER PUBLICATIONS

International Search Report, PCT/JP2021/030731, Oct. 19, 2021, 2 pgs.

(Continued)

*Primary Examiner* — Frantz B Jean
(74) *Attorney, Agent, or Firm* — Volpe Koenig

(57) ABSTRACT

An authentication apparatus holds: a combination of a concealment template generated from a secret key and biometric information through use of biometric cryptography and encrypted identity verification information obtained by encrypting identity verification information through use of the secret key; and biometric information on a user, and is configured to: extract the secret key from the concealment template through use of the biometric information on the user; acquire the identity verification information by decrypting the encrypted identity verification information through use of the extracted secret key; and verify identity of the user based on the acquired identity verification information.

19 Claims, 7 Drawing Sheets

(58) Field of Classification Search
USPC .......................................................... 713/186
See application file for complete search history.

(56) References Cited

U.S. PATENT DOCUMENTS

| | | | |
|---|---|---|---|
| 2020/0252217 A1* | 8/2020 | Mathieu ................ | H04L 9/0643 |
| 2022/0131698 A1* | 4/2022 | Badrinarayanan ...... | H04L 9/085 |
| 2023/0246839 A1* | 8/2023 | Mathieu ................ | H04L 9/0866 |
| | | | 713/186 |

OTHER PUBLICATIONS

Extended European Search Report issued on May 24, 2024 for European Patent Application No. 21925739.1.

* cited by examiner

AUTHENTICATION APPARATUS AND AUTHENTICATION METHOD

CLAIM OF PRIORITY

The present application claims priority from Japanese patent application JP 2021-020701 filed on Feb. 12, 2021, the content of which is hereby incorporated by reference into this application.

BACKGROUND

The present invention relates to an authentication apparatus and an authentication method.

Personal authentication is processing of verifying that a user is a right person registered in advance, and is basic processing executed in various information technology (IT) systems. For example, in cashless settlement, the personal authentication is executed by presenting a card represented by a credit card and a personal identification number, or a two-dimensional code displayed on a smart device or the like, to thereby execute the settlement. This mechanism has already been used widely, but incidents such as illegal settlement have often occurred. Thus, it is recommended to introduce two-element authentication which combines a plurality of authentication means to increase security.

As personal authentication means, there exist knowledge-based authentication which uses a password, a personal identification number, or the like, possession-based authentication which uses a card, a smart device, or the like, and biometric authentication which uses a fingerprint, a face, or the like. Such personal authentication means determines whether or not a person is a right person by collating data acquired in advance when registration was executed, and data acquired from a person to be authenticated when the authentication is executed.

A method of combining two or more types of those authentication means to enable an illegal incident to be less liable to occur is referred to as "two-factor authentication." The two-factor authentication generally means a combination of two different factors, and there is, for example, a method in which the authentication is successful when both of card authentication and face authentication are successful. However, a combination of personal authentication means of the same type such as fingerprint authentication and face authentication is also effective for preventing an illegal incident.

In the personal authentication, a problem is information leakage from the registration data. For example, for the password and the personal identification number, hash values of the password and the personal identification number are typically registered. An attacker who has obtained the hash value compares the obtained hash value with a hash value corresponding to a typical plain text or a plain text leaked from another system, thereby being capable of identifying an original password and an original personal identification number, and hence can execute impersonation attack. Moreover, when biometric information, such as a fingerprint or a face, is used, feature amounts (templates) extracted from the fingerprint or the face are registered. Those feature amounts are sensitive personal information, and hence it is required to strongly protect such feature amounts.

Meanwhile, in the possession-based authentication which uses a card or a smart device, information leakage from the registration data can be prevented by storing a secret key in the card or the smart device, and registering a public key forming a pair with the secret key. When this possession-based authentication is used to encrypt registration data of another authentication means, it is possible to prevent the information leakage from the registration data in the two-factor authentication.

As the background art of this invention, there is known JP 2020-005064 A. In JP 2020-005064 A, it is described that "Personal information or biometric authentication information on each user is held in a service terminal 20 on a vehicle side as user-specific information 22d under a state in which the information is encrypted through use of a user public key. When a service use request Ru2 is input, the service terminal 20 acquires a user secret key Kus to decrypt the user-specific information 22d, and uses the decrypted result for user authentication. Even in an environment in which communication to and from a server apparatus 30 is not possible, the service terminal 20 can use the user-specific information 22d to authenticate a user. User authority information 22a is generated by the server apparatus 30, is encrypted under a state in which an electronic signature 22b of the server is added, and is transmitted to the service terminal 20" (see Abstract).

Patent Document 1: JP 2020-005064 A

The technology as described in Patent Document 1 assumes that the secret key is stored in the card and the secret key is used for the authentication. Thus, the user is required to carry a card, a smart device, or the like storing the secret key. Accordingly, when the user does not carry a card or a smart device, the user cannot be authenticated.

Moreover, when the user has lost the card or the smart device, the user cannot be authenticated. Further, when the card or the smart device is stolen, there is a fear in that a third party may use the secret key to decrypt the template. The above-mentioned problems are caused by dependence of the protection of the registration data on a possession such as the card. When the possession is not required for the authentication, and empty-handed two-factor authentication is achieved, the authentication can always be executed, and the risk caused by the loss or the theft of the possession is eliminated.

SUMMARY OF THE INVENTION

In view of the above-mentioned problems, one aspect of this invention achieves two-factor authentication which prevents information leakage from registration data through empty-handed authentication which does not require a possession for the authentication.

The one aspect of this invention adopts the following structures in order to solve the above-mentioned problems. An authentication apparatus, includes: a processor; and a memory, wherein the memory is configured to hold: a combination of a concealment template generated from a secret key and biometric information through use of biometric cryptography and encrypted identity verification information obtained by encrypting identity verification information through use of the secret key; and biometric information on a user, and wherein the processor is configured to: extract the secret key from the concealment template through use of the biometric information on the user; acquire the identity verification information by decrypting the encrypted identity verification information through use of the extracted secret key; and verify identity of the user based on the acquired identity verification information.

The one aspect of this invention can achieve two-factor authentication which prevents information leakage from registration data through empty-handed authentication which does not require a possession for the authentication.

Problems, configurations, and effects which are not mentioned above are explained in the following embodiments.

BRIEF DESCRIPTIONS OF DRAWINGS

The present invention can be appreciated by the description which follows in conjunction with the following figures, wherein.

DETAILED DESCRIPTION OF THE PREFERRED EMBODIMENT

In the following, embodiments of the present invention are explained referring the attached drawings. In the embodiments, the same configuration has the same reference letter. The embodiments are examples to achieve the present invention and do not limit a technical range of the present invention.

First Embodiment

In the first embodiment, description is given of a biometric authentication system configured as follows. The biometric authentication system uses biometric authentication based on biometric cryptography as a first authentication factor, and restores a secret key when the authentication is successful. The biometric authentication system uses this secret key to decrypt identity verification information and secret information, and verifies a second authentication factor through use of the identity verification information. The biometric authentication system generates a transaction through use of this secret information and executes this transaction.

Figure 1:
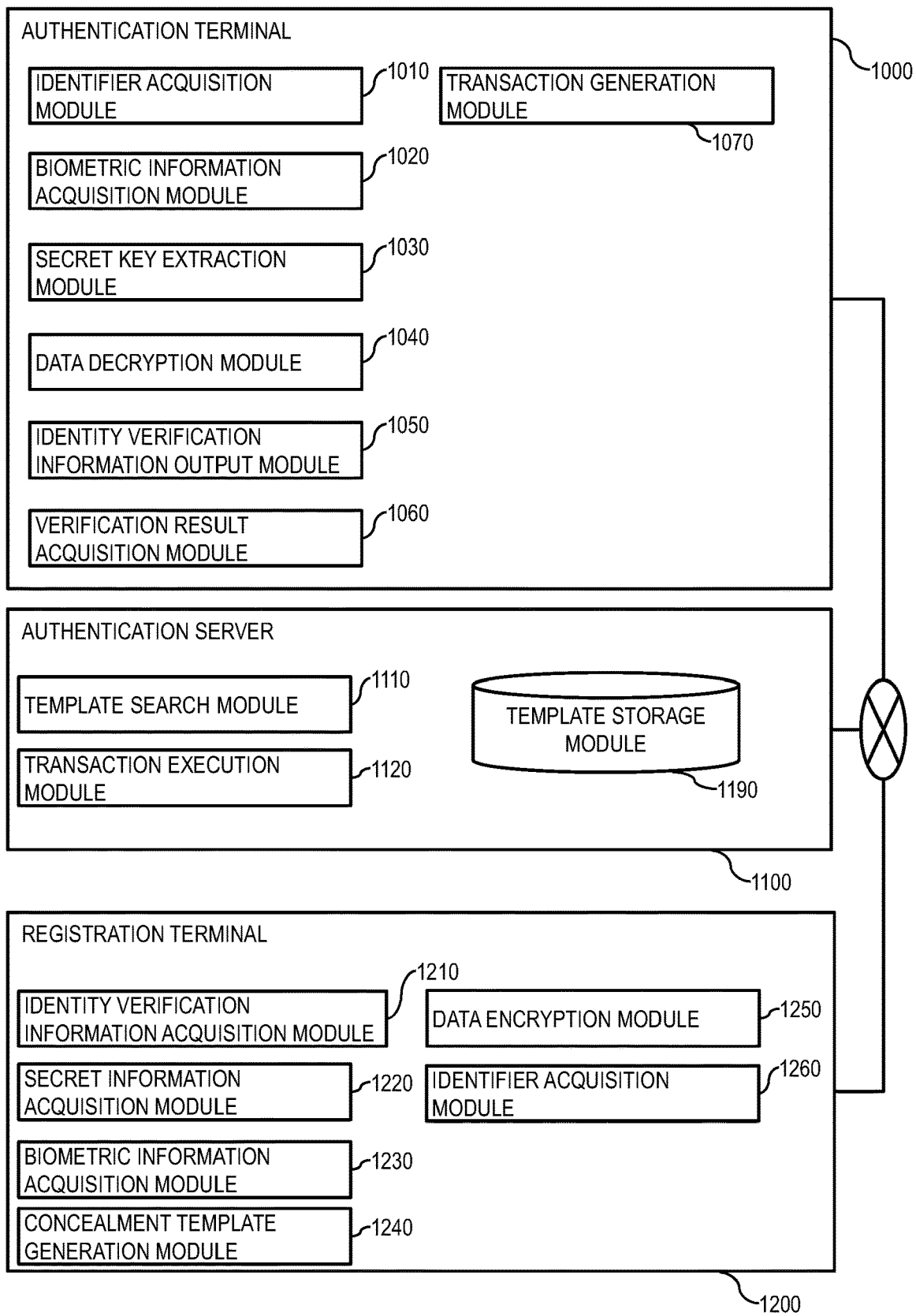
FIG. 1 is a block diagram for illustrating a configuration example of an authentication terminal, an authentication server, and a registration terminal according to the First Embodiment.

FIG. 1 is a block diagram for illustrating a configuration example of an authentication terminal, an authentication server, and a registration terminal. An authentication terminal 1000, an authentication server 1100, and a registration terminal 1200 are coupled to each other through a network, for example, the Internet. The authentication terminal 1000 and the registration terminal 1200 are not required to be coupled to each other.

The authentication terminal 1000 includes, for example, an identifier acquisition module 1010, a biometric information acquisition module 1020, a secret key extraction module 1030, a data decryption module 1040, an identity verification information output module 1050, a verification result acquisition module 1060, and a transaction generation module 1070.

The identifier acquisition module 1010 acquires an identifier which uniquely identifies a user. The identifier acquisition module 1010 acquires strings, such as a user name and an email address, as an identifier through an input device, for example, a keyboard. In the first embodiment, description is mainly given of an example in which the identifier acquisition module 1010 acquires an identifier specified by the user, but the acquisition of the identifier is not limited to this example. For example, the identifier acquisition module 1010 may acquire an identifier automatically assigned by the authentication server 1100, or may read an identifier assigned by another means in advance.

The biometric information acquisition module 1020 acquires biometric information, such as a fingerprint, a face, an iris, a vein, a palmprint, a retina, and a voiceprint, from the user. The biometric information acquisition module 1020 may acquire the biometric information from a dedicated device, for example, a fingerprint sensor and a vein sensor, or may acquire the biometric information from a general-purpose device, such as a camera and a microphone.

The secret key extraction module 1030 extracts the secret key from a concealment template and the biometric information based on the biometric cryptography. The biometric cryptography is an example of a template protection technology which is used to generate a concealment template from biometric information and a secret key when registration is executed, and to extract the secret key from the concealment template and the biometric information when the authentication is executed. The concealment template is designed such that even when an attacker obtains the concealment template, the biometric information and information on the secret key are not leaked. A safe biometric authentication system can be built by converting the biometric information and the secret key to the concealment template.

The data decryption module 1040 decrypts encrypted data through use of the secret key. Any one of symmetric key cryptography which encrypts data through use of a secret key, public key cryptography which encrypts data through use of a public key paired with a secret key, and the like is an example of an encryption method for data.

The identity verification information output module 1050 outputs identity verification information. Any one of a photograph of a face, a name, an image of a driver's license, an image of a passport, a secret image known to only oneself, secret question and answer, and the like is an example of the identity verification information. The identity verification information may be biometric information of the user, such as the fingerprint, the face, the iris, the vein, the palmprint, the retina, and the voiceprint, or data which indicates a change in the biometric information. The identity verification information output module 1050 displays the above-mentioned identity verification information on, for example, a display or a smart device in a form which the user himself or herself or a verifier such as a shop clerk can visually recognize.

The verification result acquisition module 1060 acquires a result of verification of the identity verification information output by the identity verification information output module 1050 executed by the user himself or herself or the verifier. Typically, the verifier such as a shop clerk compares a content of the photograph of the face, the image of the driver's license, the image of the passport, or the like and the user with each other, and inputs a result indicating whether or not the user is the right person through use of an input device, such as a mouse, a keyboard, a voice input device, or a touch panel. The verification result acquisition module 1060 acquires this result.

The transaction generation module 1070 generates a transaction when the authentication is successful. The transaction corresponds to processing to be executed after the two-factor authentication (authentication through the identity verification information and the secret information), and corresponds to, for example, challenge-response for logging into a system and payment processing in a settlement system.

The authentication server 1100 includes, for example, a template search module 1110, a transaction execution module 1120, and a template storage module 1190. The template search module 1110 searches the template storage module 1190 for a template set corresponding to the identifier, to thereby acquire the template set.

The transaction execution module 1120 executes the transaction generated by the transaction generation module 1070. The template storage module 1190 holds a template set generated when the registration is executed, and this template set is read out and used when the authentication is executed.

The registration terminal 1200 includes, for example, an identity verification information acquisition module 1210, a secret information acquisition module 1220, a biometric information acquisition module 1230, a concealment template generation module 1240, a data encryption module 1250, and an identifier acquisition module 1260.

The identity verification information acquisition module 1210 acquires the identity verification information from the user via an input device, for example, a camera, a keyboard, or a scanner. The secret information acquisition module 1220 acquires the secret information, such as a credit card number or a signing key used to generate a transaction of a blockchain, via an input device, for example, a keyboard or a smart device. The secret information acquisition module 1220 can generate the secret information by itself without acquiring the secret information from the outside when the secret information is a signing key or the like.

The biometric information acquisition module 1230 acquires the biometric information on the user by the same method as that of the biometric information acquisition module 1020 of the authentication terminal 1000. The concealment template generation module 1240 generates the concealment template from the biometric information acquired by the biometric information acquisition module 1230. The data encryption module 1250 encrypts the identity verification information, the secret information, and the like through use of the secret key. The identifier acquisition module 1260 acquires the identifier by the same method as that of the identifier acquisition module 1010 of the authentication terminal 1000.

Figure 2:
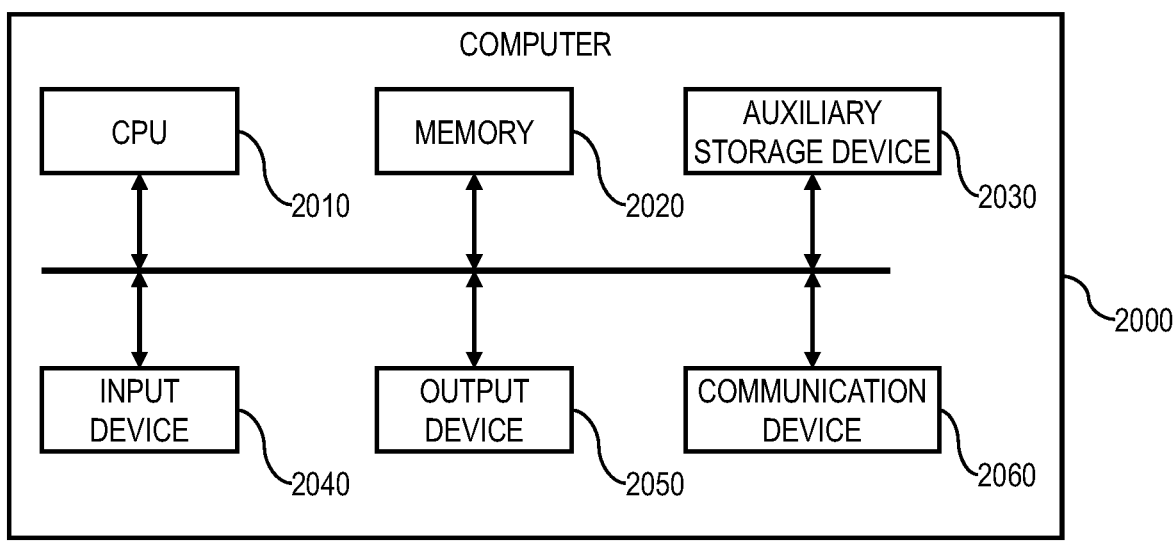
FIG. 2 is a block diagram for illustrating an example of a hardware configuration of a computer forming each of the authentication terminal, the authentication server, and the registration terminal according to the First Embodiment.

FIG. 2 is a block diagram for illustrating an example of a hardware configuration of a computer forming each of the authentication terminal 1000, the authentication server 1100, and the registration terminal 1200.

A CPU 2010 includes a processor, and executes a program stored in a memory 2020. The memory 2020 includes a read only memory (ROM), which is a nonvolatile memory device, and a random access memory (RAM), which is a volatile memory device. The ROM stores, for example, an invariant program (for example, basic input/output system (BIOS)). The RAM is a dynamic random access memory (DRAM) or other such high-speed and volatile memory device, and temporarily stores a program to be executed by the CPU 2010 and data to be used at a time of execution of the program.

An auxiliary storage device 2030 is, for example, a large-capacity and non-volatile storage device, such as a magnetic storage device (hard disk drive (HDD)) and a flash memory (solid state drive (SSD)). Programs to be executed by the CPU 2010 and data to be used when the programs are executed are stored in the auxiliary storage device 2030. Specifically, the programs are read out from the auxiliary storage device 2030, loaded onto the memory 2020, and executed by the CPU 2010.

An input device 2040 is a device, such as a keyboard or a mouse, through which input from an operator is received. Moreover, the input device 2040 may include a device which acquires the biometric information, such as a biometric sensor, a touch panel, a smart device, a scanner, and a camera.

The output device 2050 is a device, such as a display or a printer, which outputs an execution result of a program in a form which the operator can visually recognize. In particular, for example, the output device 2050 of a computer 2000 forming the authentication terminal 1000 displays the information output by the identity verification information output module 1050.

A communication device 2060 is a network interface device which controls communication to and from another device in accordance with a predetermined protocol. The communication device 2060 includes, for example, a serial interface such as USB (universal serial bus).

The programs to be executed by the CPU 2010 are provided to the computer 2000 through intermediation of a removable medium being a non-transitory storage medium (for example, CD-ROM or flash memory) or from another computer including a non-transitory storage device through the network, and is stored in the nonvolatile auxiliary storage device 2030 being a non-transitory storage medium. Therefore, the computer 2000 preferably includes an interface for reading data from the removable medium.

The authentication terminal 1000, the authentication server 1100, and the registration terminal 1200 are each a computer system formed on physically one computer or formed on a plurality of computers that are configured logically or physically, and may be operated on separate threads on the same computer, or may operate on a virtual machine built on a plurality of physical computer resources.

The CPU 2010 of the computer 2000 forming the authentication terminal 1000 includes the identifier acquisition module 1010, the biometric information acquisition module 1020, the secret key extraction module 1030, the data decryption module 1040, the identity verification information output module 1050, the verification result acquisition module 1060, and the transaction generation module 1070. The CPU 2010 of the computer 2000 forming the authentication server 1100 includes the template search module 1110, the transaction execution module 1120, and the template storage module 1190.

The CPU 2010 of the computer 2000 forming the registration terminal 1200 includes the identity verification information acquisition module 1210, the secret information acquisition module 1220, the biometric information acquisition module 1230, the concealment template generation module 1240, the data encryption module 1250, and the identifier acquisition module 1260.

For example, the CPU 2010 of the computer 2000 forming the authentication terminal 1000 operates in accordance with an identifier acquisition program loaded on the memory 2020 of this computer 2000 to function as the identifier acquisition module 1010, and operates in accordance with a biometric information acquisition program loaded on the memory 2020 of this computer 2000 to function as the biometric information acquisition module 1020. For each of the other function modules included in the CPU 2010 of this computer 2000, a relationship between a program and the function module is the same. For each of the other function modules included in the CPU 2010 of the computer 2000 forming each of the authentication server 1100 and the registration terminal 1200, a relationship between a program and the function module is also the same.

A part or the whole of the functions of the function modules included in the CPU 2010 of the computer 2000 forming each of the authentication terminal 1000, the authentication server 1100, and the registration terminal 1200 may be implemented by hardware, for example, an application specific integrated circuit (ASIC), a field-programmable gate array (FPGA), or the like.

The auxiliary storage device 2030 of the computer 2000 forming the authentication server 1100 holds the template storage module 1190. A part or the whole of information stored in the auxiliary storage device 2030 of the computer 2000 forming each of the authentication terminal 1000, the authentication server 1100, and the registration terminal 1200 may be stored in the memory 2020 of this computer 2000, or may be stored in a database coupled to this computer 2000.

Figure 3:
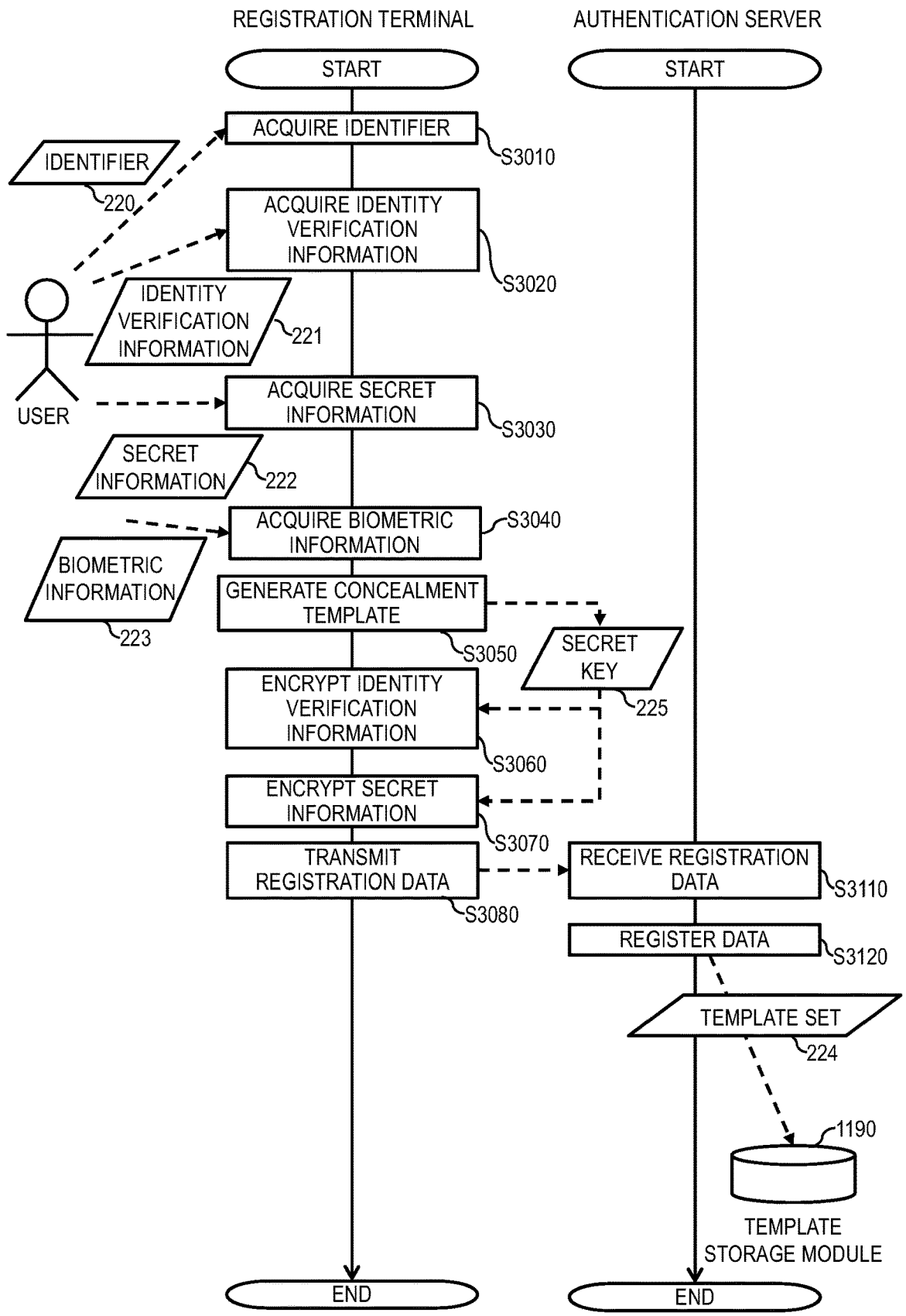
FIG. 3 is a sequence diagram for illustrating an example of initial registration processing according to the First Embodiment.

In the first embodiment, information used by the authentication terminal 1000, the authentication server 1100, and the registration terminal 1200 is not required to depend on data structure, and may be represented as any data structure. The information is represented in a tabular form in the first embodiment, but a data structure suitably selected from, for example, a list, a database, and a queue can store the information. FIG. 3 is a sequence diagram for illustrating an example of initial registration processing. The registration terminal 1200 and the authentication server 1100 execute the initial registration processing.

First, the identifier acquisition module 1260 of the registration terminal 1200 acquires an identifier 220 from the user (S3010). The user is a target person of the execution of the initial registration. The identifier is information capable of uniquely identifying the user, and is formed of, for example, a string of alphanumeric letters. The identity verification information acquisition module 1210 acquires identity verification information 221 from the user (S3020).

The secret information acquisition module 1220 acquires secret information 222 from the user (S3030). The secret information 222 is information required to generate the transaction, and includes, for example, a credit card number or a signing key used to generate a blockchain transaction. The secret information 222 can include not only the above-mentioned information, but also auxiliary information to be referred to when the transaction is to be generated. The auxiliary information includes, for example, a limit amount of money for settlement, a region in which the settlement is available, and a purpose of the settlement.

The biometric information acquisition module 1230 acquires biometric information 223 from the user (S3040). The biometric information 223 is information representing physical features and/or behavioral features of the user including the fingerprint, the face, the iris, the vein, the palmprint, the retina, and the voiceprint.

The concealment template generation module 1240 uses the biometric information 223 acquired in Step S3040 to generate the concealment template (S3050). The concealment template generation module 1240 generates the concealment template through use of the biometric cryptography represented by, for example, Fuzzy Extractor and Fuzzy Vault. Specifically, for example, the concealment template generation module 1240 randomly generates a secret key 225, and generates the concealment template from the secret key 225 and the biometric information 223. Moreover, the secret key 225 may be stored in advance in, for example, the auxiliary storage device 2030 of the computer 2000 forming the registration terminal 1200.

This concealment template is designed such that estimation of the secret key 225 and the biometric information 223 is difficult even when the concealment template is obtained by a third party. The authentication server 1100 manages the concealment template in place of the biometric information 223, thereby being capable of building a safe biometric authentication system which suppresses risks of information leakage and impersonation.

The data encryption module 1250 encrypts the identity verification information 221 through use of the secret key 225 (S3060), and encrypts the secret information 222 through use of the secret key 225 (S3070). The data encryption module 1250 transmits, to the authentication server 1100, the registration data including the identifier acquired in Step S3010, the concealment template generated in Step S3050, the encrypted identity verification information generated in Step S3060, and the encrypted secret information generated in Step S3070 (S3080).

The template search module 1110 of the authentication server 1100 receives the registration data transmitted in Step S3080 (S3110). The template search module 1110 registers a template set 224 including the concealment template generated in Step S3050, the encrypted identity verification information generated in Step S3060, and the encrypted secret information generated in Step S3070 in the template storage module 1190 so as to be linked to the identifier 220 (S3120). As a result, the initialization registration processing by the registration terminal 1200 and the authentication server 1100 is completed, and the user comes to be capable of being authenticated.

Figure 4:
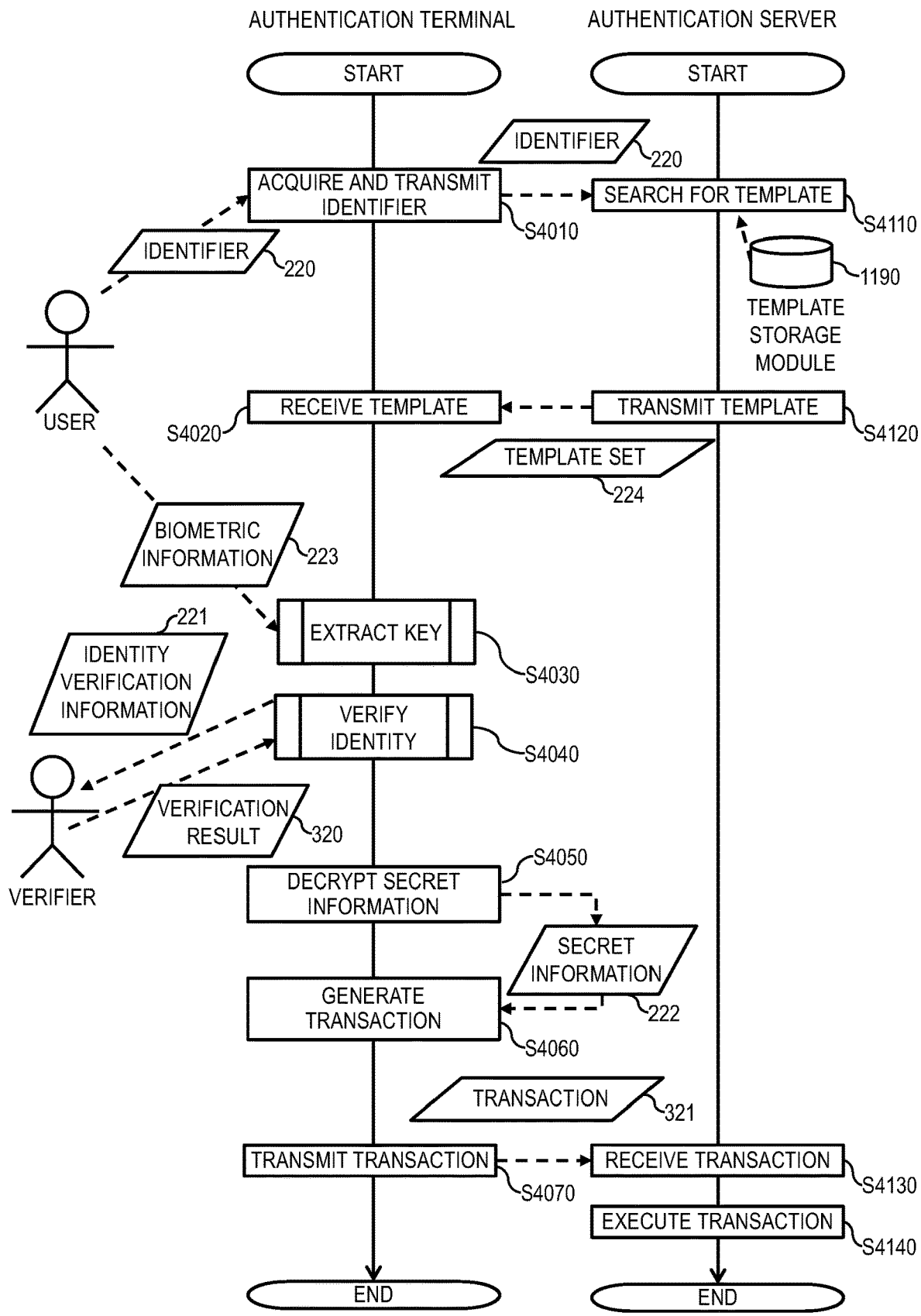
FIG. 4 is a sequence diagram for illustrating an example of authentication processing according to the First Embodiment.

FIG. 4 is a sequence diagram for illustrating an example of authentication processing by the authentication terminal 1000 and the authentication server 1100. The identifier acquisition module 1010 of the authentication terminal 1000 acquires the identifier 220 from the user, and transmits the identifier 220 to the authentication server 1100 (S4010). The template search module 1110 of the authentication server 1100 searches the template storage module 1190 for a template set corresponding to the received identifier 220, to thereby acquire the template set (S4110).

The template search module 1110 transmits the template set 224 acquired in Step S4110 to the authentication terminal 1000 (S4120). The secret key extraction module 1030 of the authentication terminal 1000 receives the template set 224 transmitted in Step S4120 (S4020).

The biometric information acquisition module 1020 acquires biometric information 223 from the user, and the secret key extraction module 1030 extracts the secret key through use of this biometric information 223 and the concealment template received in Step S4020 (S4030). The secret key extraction module 1030 extracts the secret key through use of the biometric cryptography. Specifically, when the secret key extraction module 1030 determines that an error between the biometric information 223 acquired from the user and the biometric information at the time when the concealment template was registered is less than a predetermined value, that is, the two pieces of biometric information are on the same person, the secret key extraction module 1030 can extract a correct secret key 225 generated when the concealment template was registered. Details of the key extraction processing are described later with reference to FIG. 5.

When the secret key extraction module 1030 successfully extracts the secret key in Step S4030, the identity verification information output module 1050 decrypts encrypted identity verification information to acquire identity verification information 211, and outputs the identity verification information 211 to the output device 2050. The verification result acquisition module 1060 acquires a verification result 320 based on, for example, input from the verifier (S4040). Details of the identity verification processing are described later with reference to FIG. 6.

The process may proceed to Step S4040 even when the secret key extraction module 1030 fails in the extraction of the secret key in Step S4030. In this case, the secret key extraction module 1030 has acquired an incorrect secret key, and hence the identity verification information output module 1050 cannot decrypt the encrypted identity verification information. As a result, the processing step of Step S4040 times out, and the processing of FIG. 4 is consequently finished.

When the identity verification information output module 1050 succeeds in the identity verification in Step S4040, the data decryption module 1040 decrypts the encrypted secret information received in Step S4020 through use of the secret key extracted in Step S4030, to thereby acquire the secret information 222 (S4050).

The transaction generation module 1070 generates a transaction through use of the secret information 222 acquired in Step S4050 (S4060). A credit card number or a signing key required to generate the transaction are examples of the secret information 222.

The transaction refers to processing which the user wants to execute when the authentication is successful. For example, when a purpose of the user is authentication by a server, the transaction includes challenge-response of adding an electronic signature to a random number through use of a signing key. Moreover, when the purpose of the user is settlement, the transaction includes a credit card number, a settled amount of money, and an item of expense. Further, the purpose of the user is transaction generation for a blockchain, the transaction is generated by adding an electronic signature to a part or the whole of any blockchain transaction through use of a signing key.

The transaction generation module 1070 transmits a transaction 321 generated in Step S4060 to the authentication server 1100 (S4070). The transaction execution module 1120 of the authentication server 1100 receives the transaction 321 transmitted in Step S4070 (S4130). The transaction execution module 1120 executes the transaction 321 received in Step S4130 (S4140).

When the purpose of the user is, for example, the authentication, the execution of the transaction includes permitting access and allowing the user to access content having access restriction. Moreover, when the purpose of the user is the settlement, the execution of the transaction includes transferring the transaction to a credit card company and completing processing for payment from a credit card of the user. Further, when the purpose of the user is the transaction generation for the blockchain, the execution of the transaction includes sharing this transaction on a blockchain network, executing processing, such as confirmation and mining, as required, and completing the transaction.

As a result, the authentication terminal 1000 requests the two-factor authentication, and the authentication server 1100 can complete the transaction processing. The user can decrypt the identity verification information and can be verified by the verifier by only inputting the identifier 220 and the biometric information 223, and hence the user is allowed to execute the safe empty-handed two-factor authentication without holding a card or the like.

Figure 5:
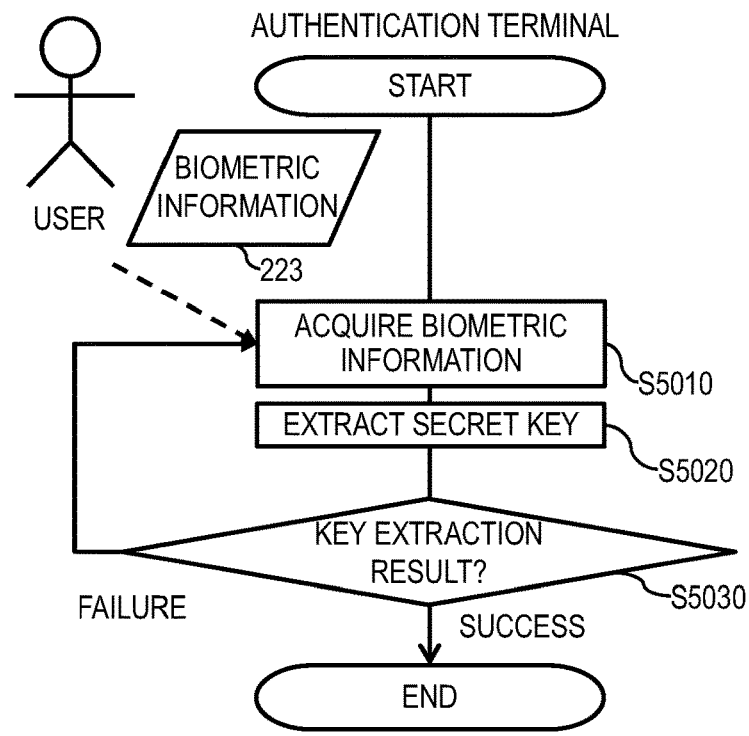
FIG. 5 is a flowchart for illustrating an example of key extraction processing according to the First Embodiment.

FIG. 5 is a flowchart for illustrating an example of the key extraction processing in Step S3030. The biometric information acquisition module 1020 of the authentication terminal 1000 acquires the biometric information 223 from the user (S5010). This biometric information is of the same type as that of the biometric information acquired in Step S3040 in the initial registration, and is, for example, the fingerprint, the face, the iris, the vein, the palm print, the retina, or the voiceprint.

The secret key extraction module 1030 executes the key extraction processing of the biometric cryptography through use of the concealment template included in the template set 224 received in Step S4020 and the biometric information 223 acquired in Step S5010 (S5020). The secret key extraction module 1030 can extract the correct secret key only when the error between the biometric information 223 acquired in Step S3040 when the registration was executed and the biometric information 223 acquired in Step S5010 when the authentication was executed is less than the predetermined value.

When the error between the pieces of the biometric information is equal to or larger than this predetermined value, the secret key extraction module 1030 fails in the extraction of the secret key, or extracts an incorrect secret key. As a result, the secret key extraction module 1030 can acquire the secret key only when the same person as the registered user executes the authentication, and can thus execute the subsequent data decryption. Accordingly, in the first embodiment, the identity verification information and the secret information are strongly protected, and hence such safety that only the right person can make access is achieved.

The secret key extraction module 1030 determines whether or not the extraction result of the secret key in Step S5020 is successful (S5030). When the secret key extraction module 1030 determines that the extraction result of the secret key is failure ("failure" in Step S5030), the process returns to Step S4010. When the secret key extraction module 1030 determines that the extraction result of the secret key is success ("success" in Step S5030), the secret key extraction module 1030 finishes the key extraction processing. With the above-mentioned processing, even when the user is empty-handed, the secret key can safely be extracted.

The secret key extraction module 1030 may finish the secret key extraction processing only when the secret key extraction module 1030 extracts the correct secret key as described above, or may finish the secret key extraction processing under a state in which an incorrect secret key is extracted after the secret key extraction module 1030 has generated the secret key a predetermined number of times, but has been unable to extract the correct secret key.

Figure 6:
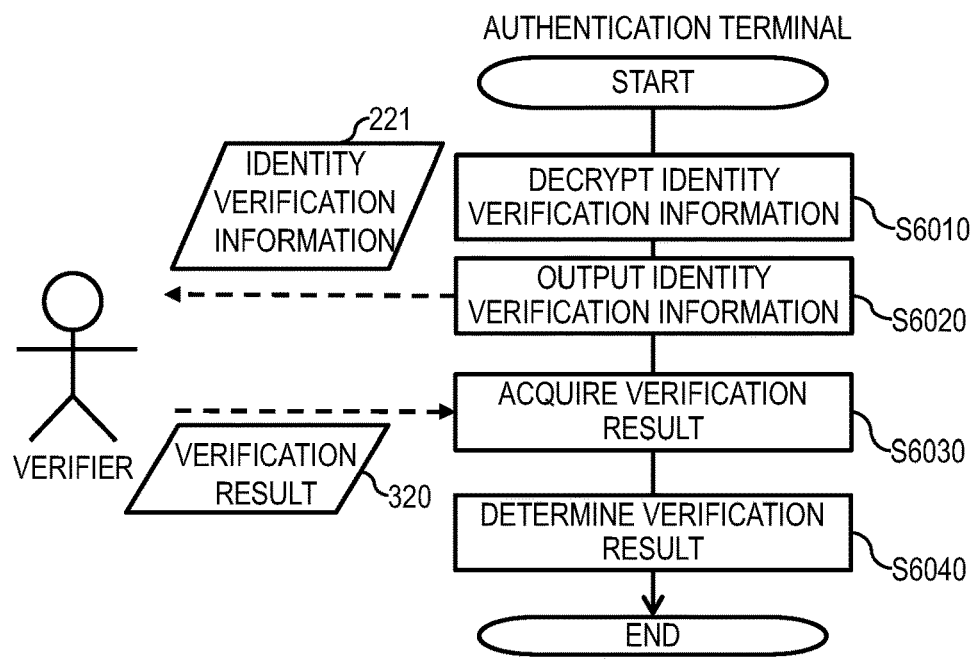
FIG. 6 is a flowchart for illustrating an example of identity verification processing according to the First Embodiment.

FIG. 6 is a flowchart for illustrating an example of the identity verification processing in Step S4040. The authentication terminal 1000 decrypts the identity verification information in the identity verification processing, presents the identity verification information to the verifier, and receives the verification result, to thereby achieve the authentication for the second factor following the biometric authentication.

First, the data decryption module 1040 decrypts the encrypted identity verification information included in the template set 224 received in Step S4020 through use of the secret key extracted in Step S5020 (S6010).

The identity verification information output module 1050 outputs the decrypted identity verification information 221 to the input device 2040, to thereby request the verifier for the verification (S6020). This verifier is a third party, for example, a shop clerk of a shop in which the verification terminal 1000 is installed. For example, when the verifier is a third party, and the photograph of the face, the image of the driver's license, the image of the passport, or the like is used as the second factor for the authentication, the identity verification information output module 1050 displays this piece of identity verification information on the output device 2050, and the verifier visually verifies whether the user trying the authentication is the right person.

The input device 2040 of the authentication terminal 1000 receives the input of a verification result 320 from the verifier (S6030), and the identity verification information output module 1050 makes determination for this verification result (S6040). When the verifier is a third party, the verifier is prompted to select, for example, a value, such as "match" or "mismatch," as the verification result. The identity verification information output module 1050 acquires this verification result and determines the value of the verification result. When the determination result of the identity verification is "mismatch," the processing may be finished without the process proceeding to Step S4050.

The identity verification information used for the authentication for the second factor remains encrypted until the decryption in Step S6010, and hence another person cannot verify the content of the identity verification information. Thus, it is possible to prevent the information leakage from the registration data, thereby being capable of achieving a safe two-factor authentication system.

Second Embodiment

In the second embodiment, the identifier acquisition processing in Step S3010 executed in the first embodiment is not executed, and the key extraction processing is executed for all of the registration data. In the authentication in the first embodiment, one piece of registration data corresponding to the identifier is extracted, and the collation is then executed. Thus, this authentication is referred to as "1:1 authentication." Meanwhile, in the authentication in the second embodiment, the identifier is not input, and collation to all of the N pieces of registration data is executed. Thus, this authentication is referred to as "1:N authentication."

In the 1:N authentication, the identifier is not input, and the authentication is completed by inputting only the biometric information. Thus, the 1:N authentication can achieve a more convenient system than the 1:1 authentication. However, the 1:N authentication is lower in speed and precision than the 1:1 authentication. When an actual system is to be built, it is required to consider which authentication is to be employed while considering tradeoff between the convenience and the performance.

Figure 7:
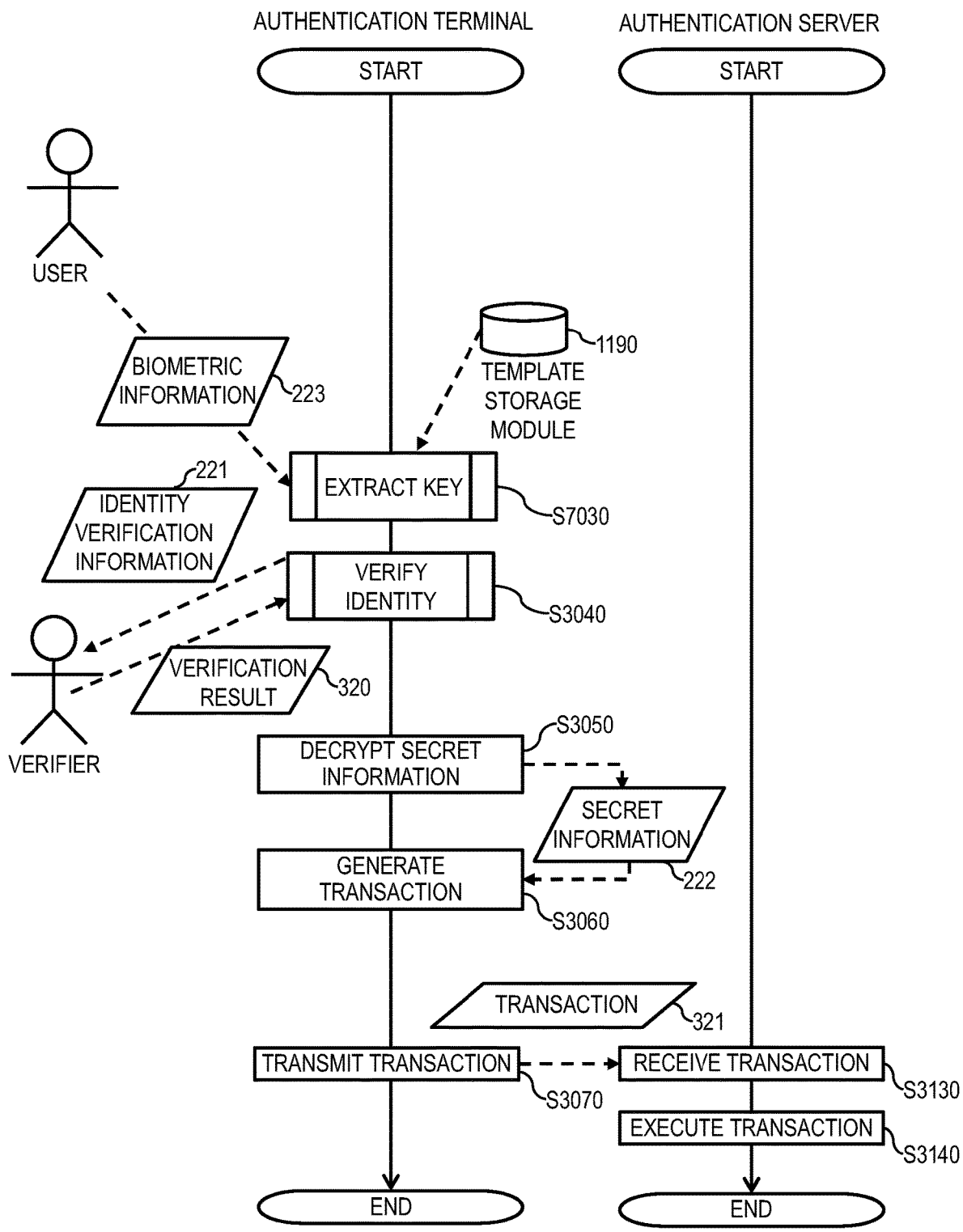
FIG. 7 is a flowchart for illustrating an example of authentication processing according to the Second Embodiment.

FIG. 7 is a flowchart for illustrating an example of the authentication processing. A point different from the flowchart of FIG. 4 is described, and description of the same points is omitted. In FIG. 7, the processing steps of Step S4010, Step S4110, Step S4120, and Step S4020 of FIG. 4 are not executed, and the authentication terminal 1000 holds the template storage module 1190 in advance.

There can be executed a standalone operation in which the authentication terminal 1000 manages this template storage module 1190 to execute the registration and the authentication, or there can be executed such an operation that the registration is executed in the authentication server 1100, and the template storage module 1190 on the authentication server 1100 and the template storage module 1190 on the authentication terminal 1000 are then synchronized. As described above, the key extraction processing in Step S7030 is executed for all of the concealment templates. Processing after the key extraction processing in Step S7030 is the same as that of FIG. 4. As a result, in the second embodiment, labor for inputting the identifier in the first embodiment is eliminated, and hence an authentication system more convenient for the user can be achieved.

Third Embodiment

Figure 8:
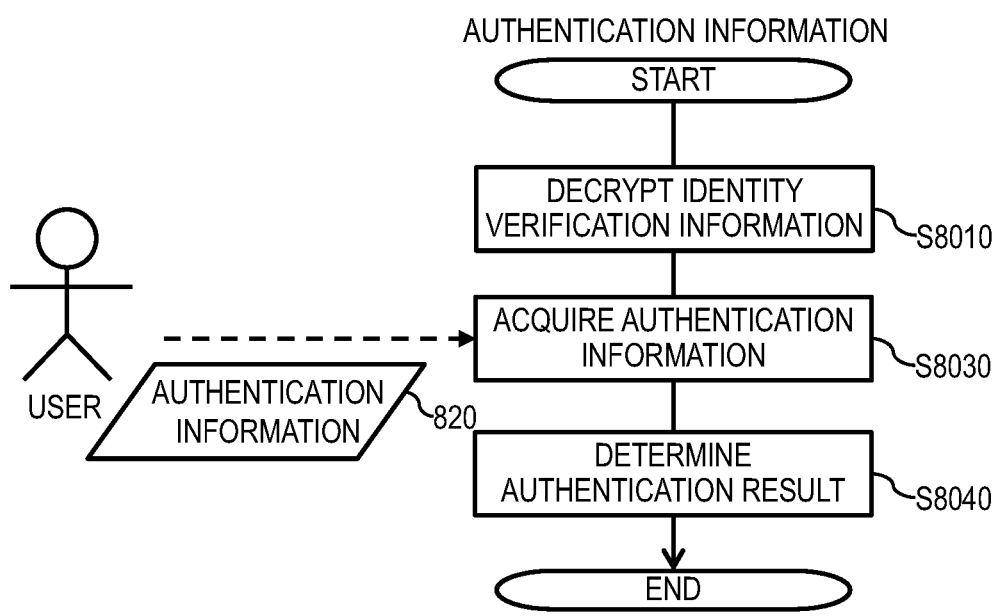
FIG. 8 is a flowchart for illustrating an example of identity verification processing according to the Second Embodiment.

In the third embodiment, the identity verification processing in Step S4040 executed in the first embodiment is replaced by processing of FIG. 8. In the first embodiment, the authentication terminal 1000 outputs the identity verification information to the verifier who is a third party and the verification result input by the verifier is acquired, to thereby execute the authentication.

In the third embodiment, the user himself or herself executes the second authentication in place of the verifier. The second authentication by the authentication terminal 1000 in the first embodiment depends on the verifier who is a third party, and hence is assumed to be used at, for example, a cash register of a shop. The authentication terminal 1000 in the third embodiment can complete the authentication action only by the user himself or herself without depending on a third party, and hence can be applied to a procedure at home of the user or a self-service checkout terminal.

FIG. 8 is a flowchart for illustrating an example of the identity verification processing in Step S4040. The data decryption module 1040 decrypts the identity verification information (S8010). The identity verification information acquired through the decryption in Step S8010 is a string or data converted from a string, such as a password, a hash value of a password, biometric information, data obtained by processing biometric information, a secret image, and a secret question, and is information which can be used to ask the user a question to acquire a response, to thereby verify whether the user is the right person.

The identity verification information output module 1050 acquires authentication information 820 from the user (S8030). The authentication information 820 includes information of the same type as the identity verification information, for example, a password, biometric information, a selection result of a secret image, and an answer to a secret question.

The identity verification information output module 1050 collates the authentication information acquired in Step S8030 and the identity verification information to each other, to thereby determine whether or not the user is the right person (S8040). When the identity verification information output module 1050 succeeds in the authentication in Step S8040, the process proceeds to processing after Step S4050 of FIG. 4, and the same processing as that in the first embodiment progresses. When the identity verification information output module 1050 fails in the authentication in Step S8040, the processing steps of Step S8040 may be canceled.

The processing steps of Step S8010 to Step S8040 may be executed only when the key extraction in Step S4030 succeeds, or may be executed even when the key extraction in Step S4030 fails. When such an algorithm that a result of the failed authentication is returned when the key extraction in Step S4030 fails is employed, the two-factor authentication cannot be successful even when the procedure in Step S8010 to Step S8040 is executed. Thus, the processing can be canceled in Step S4030.

Meanwhile, when such an algorithm that the authentication failure is not determined when the key extraction in Step S4030 fails and an incorrect secret key is extracted is employed, the failure in the biometric authentication cannot be detected. Thus, the processing steps of Step S8010 to Step S8040 are executed.

When this algorithm is employed, incorrect identity verification information is decrypted in Step S8010, and hence, even when the user inputs correct authentication information 820, the authentication fails in Step S8040. In this system, it is required for an attacker who is trying an illegal authentication to simultaneously succeed in both the first biometric authentication and the second identity verification when the attacker conducts impersonation. Thus, the attacker cannot make independent attack against each authentication, and hence the system has higher security than that in the case in which the processing is canceled in Step S4030 when the authentication fails.

The biometric information has already been acquired in the key extraction processing when the biometric information is registered as the identity verification information. Thus, the authentication information acquisition processing in Step S8030 may be omitted, and the biometric information which has already been acquired and the decrypted identity verification information may be compared with each other, to thereby make the determination in the authentication result determination processing in Step S8040.

As a result, the authentication terminal 1000 in the third embodiment executes the authentication by the user himself or herself in place of the authentication by a third party required in the first embodiment, thereby being capable of receiving various services based on the two-factor authentication.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. An authentication apparatus that prevents information leakage from registration data through empty-handed authentication, the authentication apparatus comprising:
    a communication interface that is communicatively coupled to a memory, wherein the memory stores plurality of concealment templates that are each generated from a secret key and respective biometric information through use of biometric cryptography,
    one or more processors that are communicatively coupled to the communication interface, wherein the one or more processors are collectively configured to:
        obtain a particular concealment template from among the plurality of concealment templates based on an identifier received from a user,
        receive biometric information from the user,
        extract the secret key from the particular concealment template using the biometric information received from the user,
        acquire identity verification information by decrypting encrypted identity verification information using the secret key extracted, wherein the identity verification information includes a photograph of the user
        receive a verification result from a third party in response to displaying the photograph to the third party, and
        verify an identity of the user based on the verification result.

2. An authentication method that prevents information leakage from registration data through empty-handed authentication the authentication method comprising:
    obtaining a particular concealment template from among a plurality of concealment templates based on an identifier received from a user, wherein plurality of concealment templates are each generated from a secret key and respective biometric information through use of biometric cryptograph
    receiving biometric information from the user,
    extracting the secret key from the particular concealment template using the biometric information received from the user;
    acquiring identity verification information by decrypting encrypted identity verification information using the secret key extracted, wherein the identity verification information includes a photograph of the user;
    receiving a verification result from a third party in response to displaying the photograph to the third party; and
    verifying an identity of the user based on the verification result.

3. The authentication apparatus of claim 1, wherein the one or more processors are further collectively configured to:
    perform a transaction based on the identity of the user being verified.

4. The authentication apparatus of claim 1, wherein the one or more processors are further collectively configured to:
    obtain secret information in response the identity of the user being verified, and
    perform a transaction using the secret information.

5. The authentication apparatus of claim 4, wherein the secret information is a credit card number.

6. The authentication apparatus of claim 4, wherein the secret information is a signing key used to generate a transaction of a blockchain.

7. The authentication apparatus of claim 4, wherein the transaction is a credit card transaction.

8. The authentication apparatus of claim 4, wherein the transaction is a blockchain transaction.

9. The authentication method of claim 2, further comprising:
performing a transaction based on the identity of the user being verified.

10. The authentication method of claim 2, further comprising:
obtaining secret information in response the identity of the user being verified, and
performing a transaction using the secret information.

11. The authentication method of claim 10, wherein the secret information is a credit card number.

12. The authentication method of claim 10, wherein the secret information is a signing key used to generate a transaction of a blockchain.

13. The authentication method of claim 10, wherein the transaction is a credit card transaction.

14. A non-transitory computer readable storage medium storing instructions for preventing information leakage from registration data through empty-handed authentication, the instructions when executed by a processor cause the processor to perform a method comprising:
obtaining a particular concealment template from among a plurality of concealment templates based on an identifier received from a user, wherein plurality of concealment templates are each generated from a secret key and respective biometric information through use of biometric cryptograph;
receiving biometric information from the user;
extracting the secret key from the particular concealment template using the biometric information received from the user;
acquiring identity verification information by decrypting encrypted identity verification information using the secret key extracted, wherein the identity verification information includes a photograph of the user;
receiving a verification result from a third party in response to displaying the photograph to the third party; and
verifying an identity of the user based on the verification result.

15. The non-transitory computer readable storage medium of claim 14, wherein the method further comprises:
performing a transaction based on the identity of the user being verified.

16. The non-transitory computer readable storage medium of claim 14, wherein the method further comprises:
obtaining secret information in response the identity of the user being verified, and
performing a transaction using the secret information.

17. The non-transitory computer readable storage medium of claim 16, wherein the secret information is a credit card number.

18. The non-transitory computer readable storage medium of claim 16, wherein the secret information is a signing key used to generate a transaction of a blockchain.

19. The non-transitory computer readable storage medium of claim 16, wherein the transaction is a credit card transaction.

* * * * *